United States Patent [19]

Masatchi

[11] 3,834,744
[45] Sept. 10, 1974

[54] PIPE COUPLING

[75] Inventor: Morteza Masatchi, Rochester, N.Y.

[73] Assignee: Garlock Inc., Palmyra, N.Y.

[22] Filed: June 19, 1972

[21] Appl. No.: 264,321

[52] U.S. Cl............... 285/373, 24/279, 29/526, 277/206 R, 277/235 R, 285/55, 285/368
[51] Int. Cl............................................. F16l 21/06
[58] Field of Search .......... 285/373, 369, 236, 112, 285/DIG. 12, 233, 372, 368, 55, 235, 229, 373, 112; 277/206 R, 235 R

[56] References Cited
UNITED STATES PATENTS

| | | | |
|---|---|---|---|
| 1,976,797 | 10/1934 | Naylor | 285/373 |
| 2,009,744 | 7/1935 | Pfefferle | 285/373 X |
| 2,793,883 | 5/1957 | Main | 285/369 X |
| 3,006,663 | 10/1961 | Bowne | 285/373 X |
| 3,084,959 | 4/1963 | Stanton | 285/DIG. 12 |
| 3,479,066 | 11/1969 | Gittleman | 285/236 |
| 3,633,947 | 1/1972 | Nelson | 285/DIG. 12 |
| 3,667,782 | 6/1972 | Viazzi | 285/369 X |

Primary Examiner—Thomas F. Callaghan
Attorney, Agent, or Firm—Schovee & Boston

[57] ABSTRACT

A pipe coupling for use with a coupling shell for sealingly connecting together two adjoining pipe ends, said coupling including an elastomeric gasket overlying the pipe ends and the gap therebetween and a rigid back-up ring overlying the gasket and forming a cavity between the ring and gasket. Installation of the coupling shell compresses the gasket, and the central portion of the gasket over the gap, when forced to move, preferentially moves into the cavity and away from the gap. Several gasket-ring embodiments are described, and each one prevents the gasket from moving or being extruded into the gap between the pipe ends. The cavity is preferably formed as a groove in the I.D surface of the ring between two inwardly extending flanges; the flanges prevent all portions of the gasket except the underlying central portion from being able to move into and fill-up the cavity. The gasket has a cylindrical I.D. surface that can easily be provided with a corrosion resistant liner and that can easily slip over the adjoining pipe ends. The gasket-ring assembly can be used with conventional coupling shells and pipe ends, or the ring can be an integral part of a new coupling shell of this invention. The gasket also has recesses on its O.D. surface to prevent any elastomer from extending into the gaps between arcuate portions of the coupling shell.

12 Claims, 14 Drawing Figures

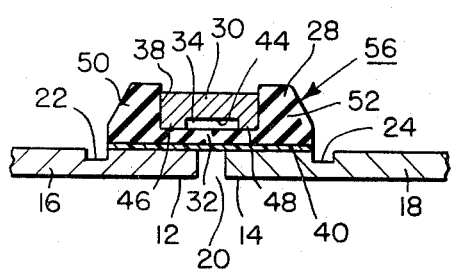
FIG. IA
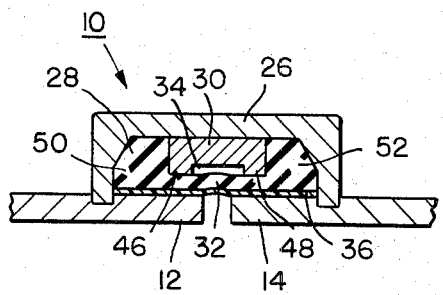
FIG. IB
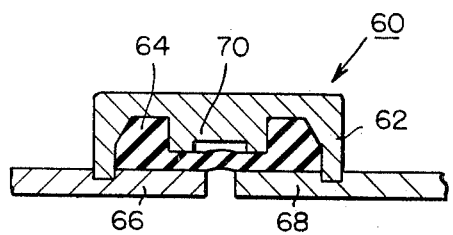
FIG. 2
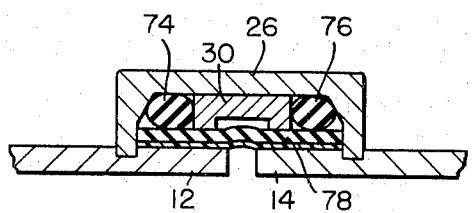
FIG. 3
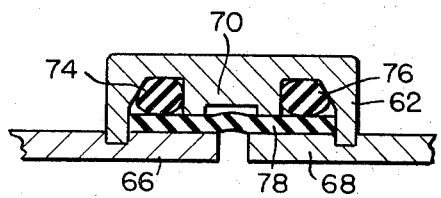
FIG. 4
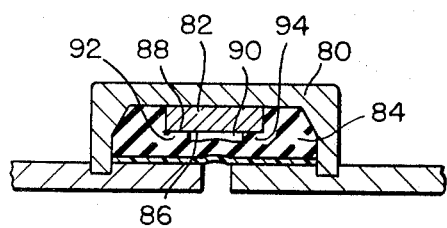
FIG. 5
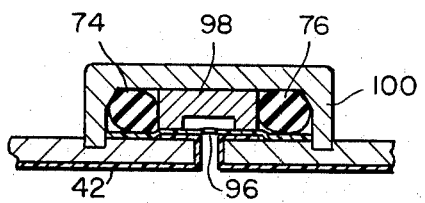
FIG. 6

PIPE COUPLING

BACKGROUND OF THE INVENTION

1. Field of the Invention

This invention relates to pipe couplings, and in a preferred application thereof to a compression type pipe coupling for use with corrosive fluids.

2. Description of the Prior Art

Pipe couplings are known, however, they are subject to various disadvantages that are overcome by the present invention. For example, one known type of coupling for corrosive liquids employs a solid elastomer gasket which, when compressed and exposed to high temperatures, thermally expands and extrudes into the gap between the pipe ends. The gasket is provided with a corrosion resistant liner which can get pinched between the pipe ends and tears or rips providing a hole through which the corrosive liquid can attack the rubber or elastomer of the gasket. The present invention overcomes this problem in the prior art by preventing the gasket and/or liner from moving into the gap between the pipe ends, and thus prevents the liner from being pinched between the pipe ends.

Another known type of coupling gasket is not subject to the disadvantage of being pinched between the pipe ends, because it employs a C-shaped cross-section that remains outside of the gap. However, this prior art gasket is subject to the disadvantages that it forms an internal cavity that poses a contamination problem. That is, the internal cavity fills up with the fluid flowing through the pipe. When it is desired to feed a different fluid through the pipe, it may be necessary to first remove the first fluid from the pipe. However, the fluid that is caught in the internal cavity is difficult to remove therefrom, and often it is necessary to remove the entire pipe coupling to clean it or to draw a vacuum in the pipe. Another disadvantage of the C-shaped coupling is that it is relatively difficult to install over the pipe ends; the pipe ends are first greased before the C-shaped gasket is shoved onto the pipe ends. Another disadvantage of the C-shaped gasket is that when it is desired to use a corrosion resistant liner, it is difficult to machine the liner to a proper shape after bonding it to the gasket, and bonding the liner to the gasket during molding is not economically feasible or practicable. The pipe coupling of the present invention overcomes the above mentioned problems of the C-shaped gasket in that it does not employ a contaminating internal cavity, it is not difficult to slip onto the pipe ends, and it is simple to bond or apply a corrosion resistant liner thereto.

It is therefore an object of the present invention to provide an improved pipe coupling which overcomes the disadvantages of prior art couplings. It is another advantage of the present invention to provide a pipe coupling gasket that easily slips onto the adjoining pipe ends, that has a cylindrical I.D. surface for ease of applying a corrosion resistant liner thereto, that does not become pinched in the gap between the pipe ends, and that does not provide a contaminating internal cavity.

SUMMARY OF THE INVENTION

A pipe coupling including an elastomeric gasket, a rigid back-up ring overlying at least the center portion of the gasket, and a cavity between the ring and the central portion of the gasket overlying the gap. The ring-gasket assembly prevents the gasket from being forced or extruded into the gap between the pipe ends. The cavity is preferably longer than the gap so that the "path of least resistance" will be into the cavity rather than into the gap. The gasket will then take the "path of least resistance" and will move radially outwardly into the cavity rather than radially inwardly into the gap.

The rigid back-up ring can be a separate element or it can be formed as a part of the coupling shell. The gasket can be formed a one-piece member or it can be two or more pieces. The gasket can be easily provided (since it has a cylindrical I.D. surface) with a corrosion resistant liner; the liner can be bonded thereto or separate therefrom, depending on whether or not the pipe is always operated under pressure. The gasket is preferably provided with an axially extending recess or cutout at each circumferential position therearound corresponding to the gap between the coupling shell members, so that the shell can close all of the way without any gasket material being pinched between the adjoining ends of the shell. The ring is preferably a separate element from the coupling shell and it can be pre-fitted at the factory onto the gasket, and the gasket-ring assembly can then be shipped and sold as a unit. When the ring is a separate element, it is preferably a split ring to aid in its assembly onto the gasket.

BRIEF DESCRIPTION OF THE DRAWINGS

The present invention will be more fully understood by reference to the following detailed description therof, when read in conjunction with the attached drawings, wherein like reference numerals refer to like elements, and wherein:

FIGS. 1A and 1B are cross-sectional views through a preferred pipe coupling according to the present invention, with FIG. 1A showing the gasket and ring without the coupling shell, and with FIG. 1B showing the complete coupling with the coupling shell installed;

FIG. 2 is a cross-sectional view through another embodiment of the present invention;

FIGS. 3 and 4 are cross-sectional views through additional embodiments of the present invention similar to FIGS. 1 and 2, respectively, except that the gasket is in three pieces instead of being a one-piece member;

FIG. 5 is a cross-sectional side view of another embodiment of the present invention;

FIG. 6 is a cross-sectional side view through still another embodiment of the present invention;

DETAILED DESCRIPTION OF THE PREFERRED EMBODIMENTS

Figure 8:
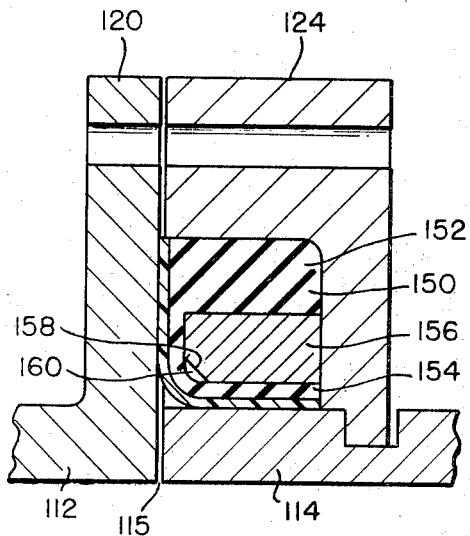
FIGS. 7, 8, and 9 are cross-sectional views through additional embodiments of a pipe coupling according to the present invention for sealingly connecting together a flanged pipe end with a grooved pipe end.

Referring now to the drawings, FIGS. 1A and 1B show the preferred embodiment of the present invention comprising a pipe coupling 10 for sealingly connecting together two adjoining pipe ends 12 and 14 of a pair of pipes 16 and 18. The pipe ends 12 and 14 are separated by a gap 20, and the pipe ends 12 and 14 each include an annular groove 22 and 24, respectively, for cooperating with a known type of coupling shell 26, in a manner well-known to those skilled in the art. The embodiment of FIG. 1 does not include any invention in the pipes 16 and 18, in the grooves 22 and 24, or in the shell 26.

According to the present invention, the pipe coupling 10 includes an annular, one-piece elastomeric gasket 28 overlying the pipe ends 12 and 14 and the gap 20, and a rigid back-up ring 30 overlying at least a central portion 32 of the gasket 28, and including at least a portion thereof radially spaced a short distance from the central portion 32 of the gasket to define or provide an annular cavity 34 therebetween. The cavity 34 is preferably wider than the gap 20, as shown in FIG. 1, so that when the shell 26 is clamped down compressing the gasket 28, the central portion 32 of the gasket, if forced to move, will move preferentially into the cavity 34 and not into the gap 20. When a fluid is fed through the pipes 16 and 18, the pressure thereof will force the central portion 32 of the gasket 28 to move still further into the cavity 34. While the compression of the gasket 28 may, in some cases, not cause the central portion 32 thereof to noticeably move, the important point is that if the central portion 32 must move, the existence of the cavity 34 will prevent it from moving into the gap 20 by causing it to move in the "path of least resistance" into the cavity 34.

The gasket 28 has a cylindrical I.D. surface 36 and has an annular groove 38 centrally located in its O.D. surface to receive the ring 30. The I.D. surface 36 has a corrosion resistant liner 40 bonded thereto. The liner 40 does not have to be bonded to the gasket 28, except when it is used in a system that employs a vacuum in the pipe. In systems under pressure at all times, the liner 40 need not actually be connected to the gasket 28. The liner is only employed if corrosive liquids are being fed through the pipe. In such cases, the pipe is either made of a corrosion resistant material like stainless steel or plastic, or else the pipe is lined, as shown by a liner 42 in FIG. 6, as will be readily understood by one skilled in the art.

The ring 30 has a cylindrical O.D. surface and has a central annular groove 44 in its I.D. surface defined between a pair of annular, radially inwardly extending arms or flanges 46 and 48. After the shell 26 is installed, the flanges 46 and 48 contact the O.D. surface of the central portion 32 of the gasket 28 thus defining the thickness of the cavity 34. The flanges 46 and 48 prevent the material of the gasket, in a pair of relatively thicker or larger end portions 50 and 52 thereof, from extruding into and filling up the cavity 34 when the shell 26 is installed. Before the shell 26 is installed, the ring 30 loosely contacts the O.D. surface of the central portion 32 of the gasket 28; then, as the shell 26 is clamped down, the compression forces on the larger end portions 50 and 52 of the gasket causes the central portion 32 to start to move into the cavity 34. By the time the central portion 32 has started to move, the flanges 46 and 48 are tight against the O.D. surface of the central portion 32 preventing the end portions 50 and 52 from being extruded into the cavity.

Figures 11A, 11B:
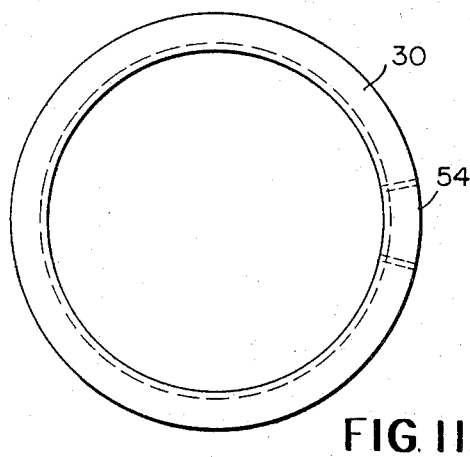
FIGS. 11A–11C are two plan views and one cross-sectional view, respectively, of a split ring of the present invention.
Figure 11C:
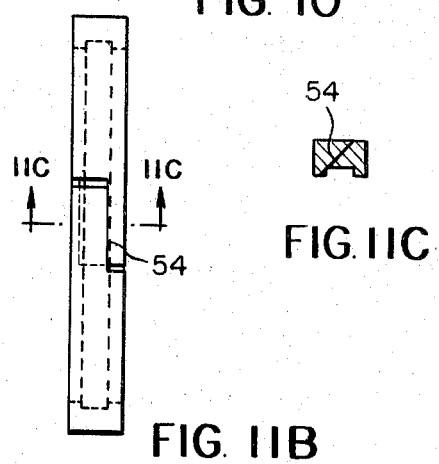

The ring 30 is preferably metal, however, it can be made from any suitable, sufficiently rigid material, such as plastic, hard rubber, wood, etc. The ring is preferably a split ring, with a split 54, for example, such as is shown in FIGS. 11A, 11B, and 11C. Any shape of split can be used and the ring 30 can be used without a split. The split 54 allows the ring 30 to be opened up or expanded to aid in installing it onto the gasket 28, after which the gasket-ring assembly 56 can be conveniently shipped and sold as a unit.

FIG. 1A shows just the gasket-ring assembly 56 installed over the two adjoining pipe ends 12 and 14 of the pipes 16 and 18, prior to clamping or installing the shell 26 thereover. The assembly 56 slips relatively easily over the pipe ends 12 and 14 since the I.D. of the gasket 28 (or of the liner 40 when a liner is employed) is approximately the same as the O.D. of the pipes 16 and 18. As shown in FIG. 1A, the gasket is not yet compressed and the ring 30 preferably has a thickness less than the depth of the groove 38. FIG. 1B shows the shell 26 installed over the gasket-ring assembly 56, the gasket 28 compressed, and the central portion 32 slightly bowed or bulging radially outwardly into the cavity 34. In this embodiment, as in all of the embodiments described below, the volume inside of the shell (or the gasket chamber), is substantially completely filled-up with the ring and the compressed gasket.

FIG. 2 shows another pipe coupling assembly 60 according to the present invention comprising a shell 62 and a gasket 64 for sealingly connecting together two pipe ends 66 and 68. The pipe coupling assembly 60 is similar to that shown in FIG. 1, except that no liner is employed on the gasket 64 and the separate ring 30 of the embodiment of FIG. 1 is, in the embodiment of FIG. 2, a ring 70 formed as an integral part of the shell 62. The shell 62 is formed in two or more separate, arcuate pieces as is the standard, known type of shell 26 in FIG. 1. This shell 62 and integral ring 70 forms one aspect of the present invention.

FIG. 3 is another pipe coupling according to the present invention which is identical to that of FIG. 1 except that instead of having a one-piece gasket 28 as shown in FIG. 1, the gasket in FIG. 3 comprises three separate pieces consisting of two O-rings 74 and 76 and a cylindrical sleeve 78. The showing of the O-rings 74 and 76 is somewhat diagrammatic since the actual compressed shape of the O-rings will depend on several factors such as their size, the amount of compressions, their hardness, etc.

FIG. 4 shows another pipe coupling embodiment of the present invention which is similar to that shown in FIG. 2 except that the one-piece gasket 64 in FIG. 2 is made in three separate pieces as shown in the embodiment of FIG. 3, and comprises the pair of O-rings 74 and 76 and the sleeve 78.

FIG. 5 shows another pipe coupling embodiment of the present invention comprising a shell 80, a ring 82 and a gasket 84. This embodiment is similar to the embodiment shown in FIG. 1 except that the ring does not have a groove 44 in its I.D. surface as does the ring 30 of FIG. 1, but rather has a cylindrical I.D. surface. However, the gasket has a slightly different design from that shown in FIG. 1, in that the bottom surface 86 of its O.D. groove 88 has an additional, narrower central groove 90 therein providing a pair of ledges 92 and 94 which basically serve the same purpose as the flanges 46 and 48 of the FIG. 1 embodiment.

FIG. 6 shows another pipe coupling embodiment of the present invention similar, for example, to that of FIG. 3, except that in FIG. 6 the sleeve piece of the 3- piece gasket is simply a liner 96 of corrosion resistant material, and the ring 98 is thus somewhat thicker extending all the way from the liner to a shell 100. The O-rings 74 and 76 can also be larger than in the embodiment of FIG. 3. The embodiment of FIG. 6 further shows the alternative embodiment of the pipes employing the corrosion resistant liner 42.

Figure 9:
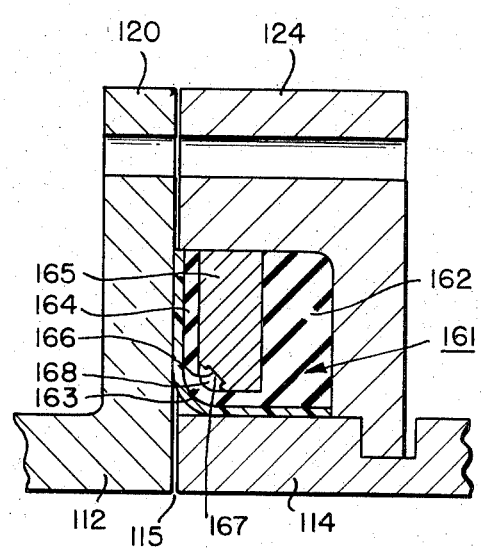
Figure 7:
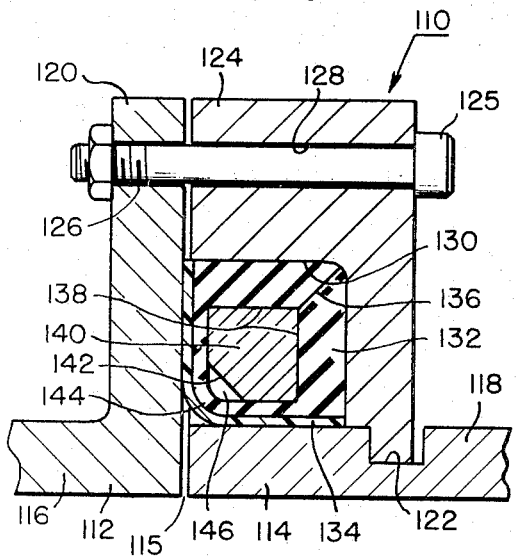

FIGS. 7–9 show a pipe coupling according to the present invention as applied for use in connecting together two adjoining pipe ends, one of the pipe ends having a flanged end and the other having a grooved end. FIG. 7 shows a pipe coupling assembly 110 according to the present invention for sealingly connecting together two adjoining pipe ends 112 and 114 of a pair of pipes 116 and 118. The pipe end 112 has a flange 120 and the pipe end 114 has an annular groove 122, which groove and flange cooperate with a shell 124 by means of a bolt 125 passing through a pair of cooperating openings 126 and 128 in the flange and shell respectively, as is well-known in the art. The pipe ends 112 and 114 are separated by a gap 115. The shell 124 includes an annular gasket chamber 130 for receiving and compressing a gasket 132 into sealing engagement with the pipe ends 112 and 114. The gasket 132 is shown with a liner 134 that can be bonded to the gasket 132 or not as discussed above. According to the present invention, a gasket-ring assembly is installed in the gasket chamber 130, and includes the gasket 132 and a ring 140. The gasket 132 is formed with a split 136 and with an internal annular cavity or groove 138 for receiving the annular rigid back-up ring 140. The ring 140 is provided with a back-up surface 142 spaced-apart from a central portion 144 of the gasket 132 to define and provide a cavity 146 therebetween (similar to the cavity 34 in FIG. 1, for example). The back-up surface 142 is adjacent to and overlies the gap 115. The cavity 146 is formed by the back-up surface 142 being at a diagonal (being at an angle to the pipe axis) and by the central portion 144 of the gasket curving between two gasket end portions having surfaces at right angles to each other. The cavity 146 is layer than the gap 115 so that if the central portion 144 of the gasket 132 is forced to move it will move preferentially into the cavity 146 rather than into the gap 115. The gasket 132 is similar to the gasket of FIGS. 1–6 in that the gasket 132 includes the relatively thin central portion 144 in-between two relatively thicker end portions, as contrasted to the gaskets of the two embodiments of FIGS. 8 and 9 described below.

FIG. 8 shows another pipe coupling embodiment of the present invention similar to that shown in FIG. 7 except that the embodiment of FIG. 8 employs a different gasket 150. The gasket 150 includes only one enlarged end portion 152 connected to a cylindrical sleeve 154 folded around a ring 156 as shown in FIG. 8. The ring 156 includes a back-up surface 158 and a cavity 160 as in FIG. 7.

FIG. 9 shows another embodiment of the present invention similar to that shown in FIG. 8. FIG. 9 shows a gasket 161 and a ring 165. The gasket 161 has a relatively thicker end portion 162, a relatively thinner central portion 163, and a relatively thinner end portion 164. The ring 165 has a back-up surface 166 spaced-apart from the central portion 163 of the gasket 161 to form a cavity 168. The surface 166 can be the bottom of a groove 167 similar to the groove 44 in FIG. 1. The groove 167 can be used in each of the embodiments of FIGS. 7–9, if desired.

Figure 10:
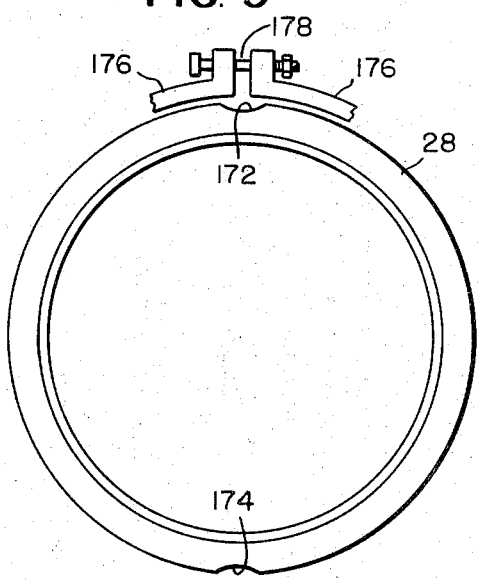
FIG. 10 is a partial plan view of a gasket of the present invention with recesses for use with the coupling shell.

FIG. 10 is a side view of the preferred gasket according to the present invention (for example, FIG. 10 shows the gasket 28 of FIG. 1). It is preferred to provide the gasket 28 with axially extending cutouts or recesses 172 and 174 located at each area around the preiphery or circumference of the O.D. surface of the gasket 28 where adjoining ends of the shell 176 meet. The recesses 172 and 174 prevent any elastomer from being forced or extruded into a gap 178 between the end portions of the shell 176 when the shell is installed. FIG. 10 shows the gasket with two recesses for use with a shell that comes in two parts. For a three part shell the gasket will have three equi-distantly spaced-apart recesses, etc. For pipes ranging in size from three-fourths –3-½ inches in diameter, the recesses are preferably about one-half inch wide and about one-eighth inch deep. For larger pipes, the recesses will be wider and deeper. The "width" of the recess refers to the dimension of the recess along the circumference of the gasket; the length of the recess is equal to the width of the gasket. These dimensions can be varied considerably as long as enough material is removed to avoid pinching the gasket when the shell is installed.

As will be understood by one skilled in the art, and as can be seen from the large number of different embodiments described above, various other arrangements of parts can be used to provide a gasket, a rigid back-up ring, and a cavity therebetween into which only the central portion of the gasket is allowed to enter. The ring can be separate from or part of the shell. The size and shape of the cavity is not critical as long as the central portion of the gasket will preferentially move into the cavity rather than into the gap; this can be done, for example, by making the cavity at least as wide as, and preferably wider than the gap; other ways such as by pre-stressing the gasket or other mechanical designs of the central portion that will cause it to move in the direction of the cavity can be used.

The gap between pipe ends is from 0 – one-eighth inch for pipes under 2 inches in diameter and is 0 – one-fourth inch for pipes over 2 inches in diameter. Thus by making the cavity at least one-fourth inch wide it can be used for all pipes regardless of size, although smaller widths (at least one-eighth inch wide) can be used for pipes under 2 inches in diameter. The depth of the cavity is not critical; a preferred size for the cavity 34 of FIG. 1 is about five-sixteenths inch wide and about 0.05 inch deep.

The invention has been described in detail with particular reference to the preferred embodiments thereof, but it will be understood that variations and modifications can be effected within the spirit and scope of the invention as described hereinabove and as defined in the appended claims.

I claim:

1. A pipe coupling for sealingly connecting together two axially spaced-apart pipe ends comprising:
    a. an annular elastomeric gasket overlying said pipe ends with a central portion of said gasket overlying a gap between said pipe ends;
    b. a rigid annular back-up ring overlying said gasket and including a central portion having a cylindrical inner back-up surface overlying said central portion of said gasket, and said ring having a cylindrical outer surface;

c. an annular pipe coupling shell installed over said gasket and ring and compressing said gasket into sealing contact with said pipe ends;

d. said elastomeric gasket having a cylindrical inner surface and wherein the outer surface of said central portion of said gasket has a diameter smaller than the diameter of two end portions of said gasket, thus defining an annular central groove in the outer surface of said gasket, e. said ring being a separate element from said shell;

f. a pair of spaced-apart, radially extending, annular shoulders, on one of said gasket and said ring, on opposite sides of said central portion of said ring and of said gasket, providing a cavity between the inner surface of said central portion of said ring and the outer surface of said central portion of said gasket, the diameter of the inner surface of said central portion of said ring being greater than the diameter of the outer surface of the central portion of said gasket, g. said shell including a cylindrical central portion having a cylindrical inner surface in contact with said cylindrical outer surface of said ring and engaging the end portions of said gasket, said shell also including two radially inwardly extending end portions defining a gasket chamber, said gasket chamber being completely filled up by said gasket and said ring when said shell is compressed onto said gasket and ring.

2. The apparatus according to claim 1 wherein said shell is formed in a plurality of separate arcuate sections having gaps between abutting section ends and wherein said gasket has an axially extending recess on its outer surface for each gap between sections of said shell, and wherein said each recess is positioned directly underneath one of said gaps in said shell.

3. The apparatus according to claim 1 wherein said pair of shoulders form a part of said ring and extend radially inwardly into contact with said gasket.

4. The apparatus according to claim 1 wherein said pair of shoulders form a part of said gasket and extend radially outwardly into contact with said ring.

5. The apparatus according to claim 1 wherein said gasket is a one-piece member.

6. The apparatus according to claim 1 wherein said gasket is a three piece gasket including a cylindrical sleeve and two O-rings.

7. The apparatus according to claim 1 wherein said ring has an axial length less than that of said gasket chamber and wherein said gasket fills two axial end portions of said gasket chamber between each end of said ring and said radially inwardly extending end portions of said shell.

8. The apparatus according to claim 7 wherein said pair of shoulders form a part of said ring and extend radially inwardly into contact with said gasket.

9. The apparatus according to claim 8 wherein said gasket is a one-piece member.

10. The apparatus according to claim 8 wherein said gasket is a three piece gasket including a cylindrical sleeve and two O-rings.

11. The apparatus according to claim 7 wherein said pair of shoulders form a part of said gasket and extend radially outwardly into contact with said ring.

12. The apparatus according to claim 11 wherein said gasket is a one-piece member.

* * * * *